United States Patent [19]

Rykwalder et al.

[11] 4,103,545
[45] Aug. 1, 1978

[54] LOAD CELL

[75] Inventors: Stanley J. Rykwalder, Farmington; Frederick J. Zink, Redford, both of Mich.

[73] Assignee: Lebow Associates, Inc., Troy, Mich.

[21] Appl. No.: 832,044

[22] Filed: Sep. 9, 1977

[51] Int. Cl.² .............................................. G01L 1/26
[52] U.S. Cl. .................................. 73/141 A; 177/229
[58] Field of Search ...................... 73/141 A; 177/229

[56] References Cited
U.S. PATENT DOCUMENTS

| | | | |
|---|---|---|---|
| 3,994,161 | 11/1976 | Trozera | 73/141 A |
| 4,022,288 | 5/1977 | Canevari | 177/229 |

FOREIGN PATENT DOCUMENTS 446,758  3/1968  Switzerland ........................ 73/141 A Primary Examiner—Charles A. Ruehl
Attorney, Agent, or Firm—Cullen, Settle, Sloman & Cantor

[57] ABSTRACT

A flexure-based transducer especially adapted for very precise measurement of small forces in either direction along or parallel to a single axis, without being adversely affected by forces applied in any other direction or by moments applied about any axis. The transducer is capable of withstanding very high overloading, without damage, by the provision of two resilient portions mounted in parallel to each other but in series between the gaged portion and a fixed support, plus an overload pin on the gaged portion which bottoms after a predetermined travel.

3 Claims, 4 Drawing Figures

LOAD CELL

BACKGROUND OF INVENTION

The present invention is directed to the objective of providing a low-cost but highly accurate load cell capable of measuring small forces to a high degree of accuracy. One application for such a device is in food packaging, wherein the quantity of food products which are industrially packaged must very closely equal the labeled weight. For example, the packager may specify that a five pound package must be accurately weighed within 0.02 percent, i.e., within 1/1000 of a pound.

Furthermore, it is desirable for protection of such a precise system that it be able to withstand substantial overloading in any direction, and that its accuracy not be adversely affected by forces acting upon it in directions other than the normal vertical axis of measurement. It is essential to attenuate or divert extraneous forces or moments around the measuring element so that the sensing element itself can be designed to optimize its response to the desired force input. In this manner, other structural elements can be designed to safely carry the extraneous or overload forces. Such a system is preferable to the use of complex electrical compensating networks, which increase the cost of the unit and also decrease its reliability.

One prior art load cell having a resemblance to portions of the novel transducer disclosed herein is that shown in U.S. Pat. No. 3,994,161. However, the present transducer has improved sensitivity to the load to be measured, improved protection for overload and improved insensitivity to extraneous forces.

DETAILED DESCRIPTION OF THE INVENTION

Figure 2:
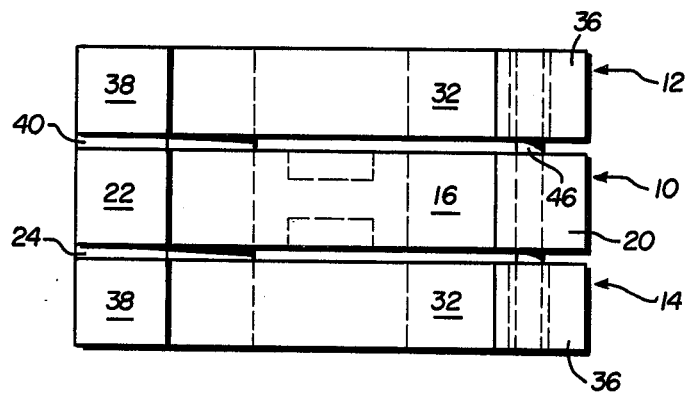
FIG. 2 is a plan view of the structure of FIG. 1.
Figure 1:
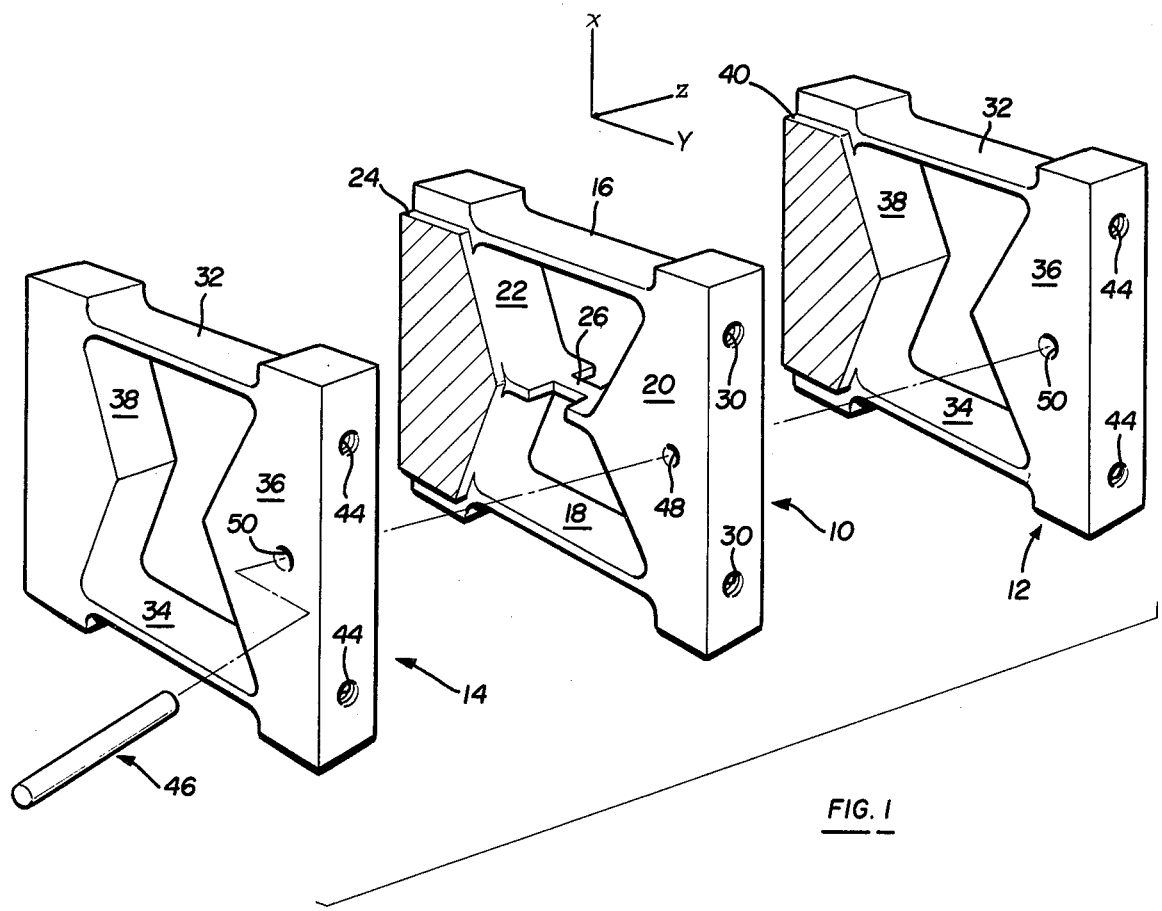
FIG. 1 is an exploded perspective view of the transducer of the present invention, showing the three major integrally joined structures severed from each other along the cross-hatch lines.

Referring to FIGS. 1 and 2 in particular, the transducer generally comprises sensing structure 10 which is symmetrically supported on opposite sides by two outer structures 12, 14. Sensing structure 10 in turn comprises upper and lower flexural beams 16, 18 connected at their ends to relatively massive and rigid end structures 20, 22. End structure 22 extends in both directions along the Z-axis to form integral connections with outer structures 12, 14, as will be explained in further detail below. One such extension is shown at 24 in FIG. 1, it being understood that the cross-hatched portion indicates where the integral connection has been cut to permit the structures to be separated for clarity of illustration. Structures 10, 12 and 14 are, it is to be emphasized, preferably formed out of one single block of metal, such as aluminum.

Sensing beam 26 interconnects end structures 20, 22 midway between upper and lower flexural beams 16, 18. Sensing beam 26 is proportioned to be much stiffer to bending loads applied along the X-axis to be measured than are flexural beams 16, 18, and it therefore carries the majority of the load applied to sensing structure 10 in the direction of the X-axis. Sensing beam 26 is illustrated as the commonly used bending beam type, using four resistance wire strain gages arranged in a Wheatstone bridge circuit. As will be understood by those skilled in the art, four strain gages would be symmetrically applied to the longitudinal axis of sensing beam 26, all four lying in a vertical plane through such axis. Thus, with sensing beam 26 halfway between flexural beam 16, 18, the majority of the extraneous load effects will be prevented from reaching beam 26, as explained below, and any residual effects will be eliminated from the output signal by the self-cancelling characteristics of the Wheatstone bridge. Preferably, sensing beam 26 is proportioned by well known techniques to take about 90% of the load applied to sensing structure 10, with each of flexural beams 16, 18 taking about 5% of the load. This is preferred because the accuracy of the measurements are improved as the gaged member carries a greater share of the load to be measured.

As mentioned above, end structures 20, 24 are proportioned to be extremely stiff, so that they will remain vertical and parallel to each other as this parallelogram-type system flexes in response to loads applied parallel to the X-axis.

Any moments about the Z-axis are resisted by tensile or compressive forces in flexural beams 16, 18. Moments about the Y-axis are resisted by shear forces across such flexural beams. Extraneous forces along the Z-axis are similarly resisted by such shear forces, and extraneous forces along the Y-axis will end load flexural beams 16, 18 and sensing beam 26 as columns. Moments about the X-axis are resisted primarily by shear forces developed at the ends of flexural beams 16, 18.

Figure 3:
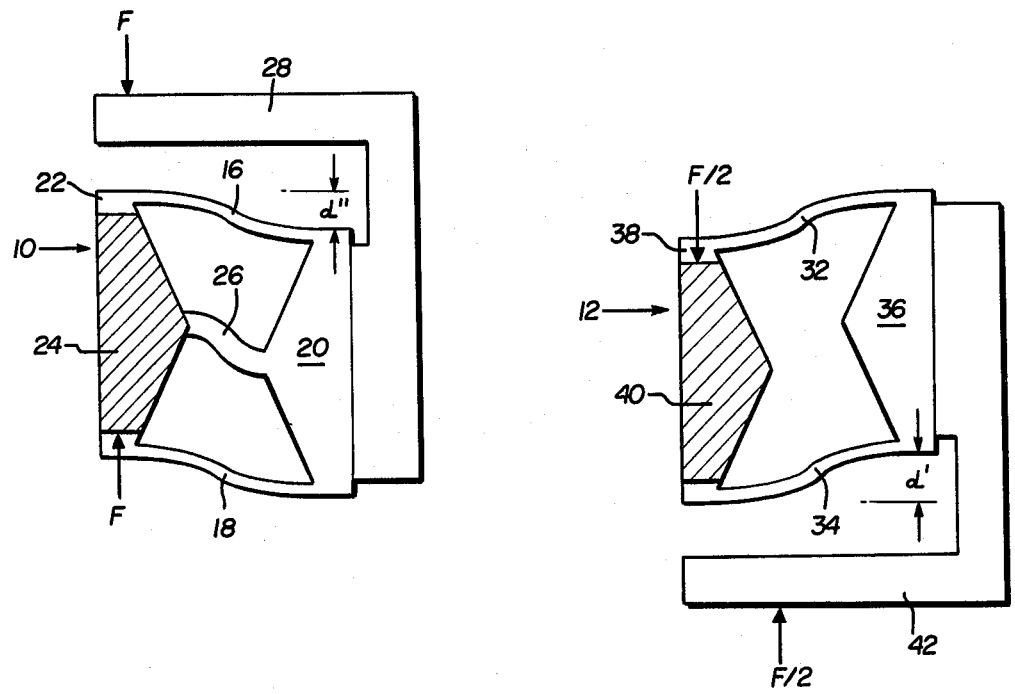
FIG. 3 is a simplified schematic diagram, in two parts, showing the manner in which the load to be measured is applied to the device and the manner in which the device is supported by a reaction-providing structure.

As shown on the left side of FIG. 3, a force to be measured is applied to force input structure 28, which may be bolted to sensing structure 10 at mounting holes 30, shown in FIG. 1.

Each of the two identical outer structures 12, 14 is integrally joined to end structure 22 of sensing structure 10, as described above. Each is essentially a spring, consisting of upper and lower flexural beams 32, 34 (similar to flexural beams 16, 18 of sensing structure 10) and rigid end structures 36, 38 (similar to corresponding elements 20, 22 of sensing structure 10). For purposes of the illustration of FIG. 1, the integral extension of end structure 22 extending toward outer structure 12 has been shown at 40. A load applied to sensing structure 10 is transmitted to outer structures 12, 14 through the extensions or joining portions 24, 40. Thus, end structure 38 is the force input element for each of the outer structures from sensing structure 10, whereas the force output element is the opposite end structure 36, which is in turn connected to force output structure 42 (see right side of FIG. 3) by means of mounting holes 44. The height of connecting portions 24, 40 is selected to make the stiffness of the unit as symmetrical as possible about the Z-axis.

As best shown in FIG. 2, the three main structural elements 10, 12 and 14 are free to flex relative to each other because they are interconnected only at the left end, that is, at elements 22, 24, 38 and 40. An overload stop pin 46, to be described below, does not interfere with the free relative flexing of these structures until a predetermined load beyond the design load has been reached.

Referring to the left side of FIG. 3, a load F applied along or parallel to the X-axis is transmitted through force input structure 28 to end structure 20, which yields downwardly relative to end structure 22, as permitted by the yieldability of beams 16, 18 and 26. As far as a free body diagram of sensing structure 10 is concerned, the reaction is provided by an upward force on end structure 22, this force having as its source the connections 24, 40 to each of outer structures 12, 14.

Referring to the right side of FIG. 3, a free body diagram of a typical outer structure 12 shows one half of the applied force F being applied to end structure 38, this force being the reaction for one-half of the total supporting forces provided by outer structures 12, 14 for sensing structure 10. End structure 38 therefore deflects downwardly relative to end structure 36, which is fixed to an unyielding force output structure 42 which in turn is supported by a rigid reaction-providing surface.

By way of example only, to illustrate the manner in which the load is distributed among the structures, let it be assumed that one half of the force F applied downwardly to each of outer structures 12, 14 will cause end structure 38 to deflect a distance $d'$ of 0.010 inches. End structure 22 of sensing structure 10 will necessarily deflect downwardly an equal amount, because it is integrally and directly connected to end structure 38. However, as shown on the left side of FIG. 3, the yieldability of beams 16, 18, 26 will permit end structure 20 to deflect downwardly an additional distance $d''$ relative to end structure 22, which distance can be assumed for this example to be 0.005 inches. Deflection $d''$ is less than the deflection $d'$ because sensing beam 26 makes sensing structure 10 substantially stiffer than outer structures 12, 14, even though each outer structure is only carrying half the load carried by sensing structure 10.

Thus, in the example, the total deflection of force input structure 28 and end structure 20 will be the sum of $d'$ and $d''$, or 0.015 inches. It will be appreciated, therefore, that the two outer structures 12, 14 are in parallel to each other, in that each takes half of applied load F, but as a pair, they are jointly in series between sensing structure 10 and force output structure 42 or ground.

Referring now to the overload protection feature, best illustrated in FIGS. 1 and 2, stop pin 46 is press fit into hole 48 in end structure 20 of sensing structure 10. It extends therefrom in both directions, parallel to the Z-axis, and into concentric clearance holes 50 in end structures 36 of outer structures 12, 14. Clearance holes 50 are larger than the diameter of pin 46 by a predetermined amount to provide the desired overload protection. That is, the free travel permitted in any direction between end structure 20 of sensing structure 10 and end structures 36 (and therefore, ground) equals the difference in radius between pin 46 and clearance holes 50. Once an applied load exceeds by a predetermined factor the design capacity of the system, pin 46 will bottom, and no further yielding of the flexural and sensing beams will occur, because the load will be transmitted directly from input structure 28 to output structure 42 by means of end structures 20, 36 and pin 46. It is to be noted that this overload system provides protection in both the up and down directions of loading.

As evident from FIG. 1, the profiles of the three major structures 10, 12 and 14 permit the load cell to be fabricated by extrusion along the Z-axis as a single integral unit. Subsequent machining can thereby be confined to removing the sensing beam portion from the two outer structures, providing the required gaps between the structures (as visible in FIG. 2) and achieving the necessary dimensional control on the various beams. In this manner, cost is substantially reduced.

By varying the thickness of flexural beams 32, 34, the natural frequency, i.e., response time, of the system can be modified without changing the apportionment of the load between beams 26 and 16, 18. This flexibility of design is useful where rapid damping is required for faster processing of measurements.

Of course, if desired, the force input and output structures 28, 42 can be designed to be formed integrally with the other structures. Although sensing beam 26 has been described as a simple bending beam, those skilled in the art will appreciate that other types of beams or shear loaded elements could be utilized.

Figure 4:
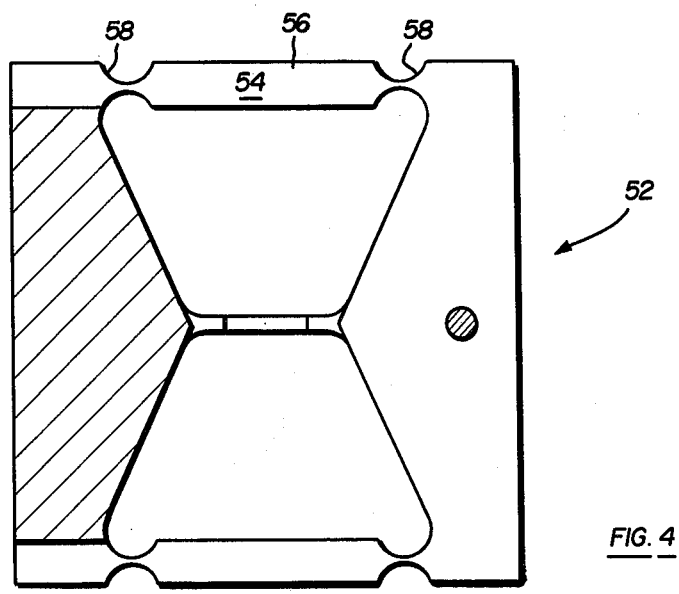
FIG. 4 is a side view of a slightly modified sensing structure.

A modified transducer having a modified sensing structure 52 is illustrated in FIG. 4. Outer structures 12, 14 would remain unchanged. The modification in the sensing structure involves replacement of the upper and lower flexural beams (16, 18 in FIG. 1) with upper and lower arms 54, which have a deeper and therefore stiffer cross-section throughout their middle portion 56. Their ends 58 are much shallower sections and function as flexural pivots to control the amount of yieldability in response to forces applied along or parallel to the X-axis. The thicker section 56 reduces the tendency of these arms to buckle as columns due to compressive loads resulting from applied force F or moments about the Z-axis, and also reduces the degree of wind up of arms 54 in torsion due to moments about the Y-axis.

This invention may be further developed within the scope of the following claims. Accordingly, the above specification is to be interpreted as illustrative of only two operative embodiments of the present invention, rather than in a strictly limited sense.

I now claim:

1. A device for measuring forces along and parallel to a first axis comprising:

a sensing structure comprising a first pair of spaced parallel beams oriented with their longitudinal axes perpendicular to the first axis and coplanar therewith; a first pair of end structures extending parallel to the first axis and interconnecting the ends of said first pair of beams; said first pair of beams and their connections with said end structures being configured to be resiliently yieldable to a relatively large degree to forces applied parallel to the first axis but substantially unyieldable to forces applied along a third axis mutually perpendicular to the first axis and to said longitudinal axes, said first pair of beams and said end structures forming a generally rectangular substantially open-centered structure which yields as a parallelogram in response to applied forces to be measured, said first pair of beams preventing relative rotation between said end structures, said pair of end structures being essentially rigid and unyieldable within the range of forces to be measured; and a sensing member located parallel to and midway between said first pair of beams and rigidly connected at its ends to the mid-points of said end structures, said sensing member being constructed and proportioned to be resiliently yieldable to forces to be measured, but less yieldable thereto than are said first pair of beams, and substantially unyieldable to forces applied along said third axis, one of said end structures adapted to have the force to be measured applied thereto as the force input element and the other of said end structures adapted to be the force output element of said sensing structure;

a pair of outer structures located on opposite sides of said sensing structure and spaced therefrom in a direction parallel to said third axis, each of said outer structures comprising a pair of spaced parallel flexural beams parallel to said first pair of beams, and a pair of end structures parallel to said first pair of end structures and interconnecting the ends of said flexural beams of said outer structures so that each of said outer structures is in the form of a generally rectangular open-centered structure which yields as a parallelogram in response to applied forces to be measured, said flexural beams preventing relative rotation between the end structures which they interconnect;

said force output element of said sensing structure being rigidly joined to the corresponding end structure of each of said outer structures, but said sensing and outer structures being otherwise normally unconnected to each other, the other end structure of each of said outer structures being rigidly connected to a fixed reaction structure;

whereby the bending of said sensing member in response to a force to be measured applied parallel to the first axis is proportional to such force.

2. The device of claim 1 wherein said first pair of beams and end structures of said sensing structure are of substantially identical cross-sectional shape to the corresponding flexural beams and end structures of said outer structures when viewed along said third axis, to permit fabrication of all three structures from a single extrusion so that said device may be formed from a single integral piece of metal.

3. The device of claim 1 which is provided with overload stop means comprising a projection on said sensing structure which extends into an oversize opening in at least one of said other end structures of said outer structures whereby the clearance between said projection and the sides of said opening provides a predetermined maximum deflection of said sensing structure.

* * * * *